United States Patent
Liu et al.

(10) Patent No.: US 11,290,883 B2
(45) Date of Patent: Mar. 29, 2022

(54) DATA TRANSMISSION METHOD, DATA TRANSMITTER, DATA RECEIVER, AND SYSTEM

(71) Applicant: Advanced New Technologies Co., Ltd., Grand Cayman (KY)

(72) Inventors: Yanghui Liu, Hangzhou (CN); Lei Wang, Hangzhou (CN); Ge Chen, Hangzhou (CN); Lingnan Shen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/379,451

(22) Filed: Jul. 19, 2021

(65) Prior Publication Data

US 2021/0352475 A1    Nov. 11, 2021

Related U.S. Application Data

(63) Continuation of application No. 16/721,591, filed on Dec. 19, 2019, now Pat. No. 11,070,977, which is a
(Continued)

(30) Foreign Application Priority Data

Jun. 7, 2016 (CN) .......................... 201610398687.8

(51) Int. Cl.
*H04L 9/32* (2006.01)
*H04W 12/06* (2021.01)
(Continued)

(52) U.S. Cl.
CPC .......... *H04W 12/06* (2013.01); *G06Q 20/206* (2013.01); *G06Q 20/3226* (2013.01);
(Continued)

(58) Field of Classification Search
CPC ............. H04W 12/06; H04W 12/1202; G06Q 20/206; G06Q 20/3226; H04B 11/00; H04L 29/06; H04L 9/32; G08C 23/02
See application file for complete search history.

(56) References Cited

U.S. PATENT DOCUMENTS 8,930,699 B2   1/2015  Guo et al.
9,100,392 B2   8/2015  Huber et al.
(Continued)

FOREIGN PATENT DOCUMENTS

CN    103793261    5/2014
CN    103903368    7/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Matthew T Henning
(74) *Attorney, Agent, or Firm* — Fish & Richardson P.C.

(57) ABSTRACT

The present application discloses systems and methods in which sound wave information associated with a data transmission is monitored within a predetermined distance from the client device, where the sound wave information including predetermined security information. In response to detecting sound wave information associated with a data transmission, the sound wave information is parsed to obtain the predetermined security information included in the detected sound wave information. Pattern information is generated based on the predetermined security information and data information to be sent. The generated pattern information is then displayed so that a second device can obtain the generated pattern information.

10 Claims, 13 Drawing Sheets

Related U.S. Application Data continuation of application No. 16/193,201, filed on Nov. 16, 2018, which is a continuation of application No. PCT/CN2017/086067, filed on May 26, 2017.

(51) Int. Cl.

| | | |
|---|---|---|
| *G08C 23/02* | (2006.01) | |
| *H04L 9/40* | (2022.01) | |
| *H04W 12/122* | (2021.01) | |
| *G06Q 20/20* | (2012.01) | |
| *G06Q 20/32* | (2012.01) | |
| *H04B 11/00* | (2006.01) | |

(52) U.S. Cl.
CPC ............ *G08C 23/02* (2013.01); *H04B 11/00* (2013.01); *H04L 9/32* (2013.01); *H04L 29/06* (2013.01); *H04W 12/122* (2021.01)

(56) References Cited

U.S. PATENT DOCUMENTS

| | | | |
|---|---|---|---|
| 9,356,924 | B1 | 5/2016 | Shahbazi et al. |
| 9,471,698 | B1 | 10/2016 | Lui et al. |
| 11,109,227 | B2* | 8/2021 | Liu .................. H04W 12/06 |
| 2007/0179905 | A1 | 8/2007 | Buch |
| 2009/0254440 | A1 | 10/2009 | Pharris |
| 2012/0006891 | A1 | 1/2012 | Zhou et al. |
| 2012/0209630 | A1 | 8/2012 | Ihm et al. |
| 2012/0249298 | A1* | 10/2012 | Sovio .................. G07C 9/37 |
| | | | 340/5.83 |
| 2013/0024308 | A1 | 1/2013 | Ramaswamy et al. |
| 2013/0166918 | A1 | 6/2013 | Shahbazi et al. |
| 2013/0171930 | A1 | 7/2013 | Anand et al. |
| 2013/0185214 | A1 | 7/2013 | Azen et al. |
| 2013/0238455 | A1 | 9/2013 | Laracey |
| 2013/0256403 | A1 | 10/2013 | MacKinnon Keith |
| 2014/0006184 | A1 | 1/2014 | Godsey |
| 2014/0067677 | A1 | 2/2014 | Ali et al. |
| 2014/0108252 | A1 | 4/2014 | Itwaru et al. |
| 2014/0156376 | A1 | 6/2014 | Sellers et al. |
| 2014/0180850 | A1 | 6/2014 | Ackley |
| 2014/0263623 | A1 | 9/2014 | Robison et al. |
| 2015/0012421 | A1 | 1/2015 | Alexeev |
| 2015/0088674 | A1 | 3/2015 | Flurscheim et al. |
| 2015/0120428 | A1 | 4/2015 | Hardison et al. |
| 2015/0120574 | A1 | 4/2015 | Xia |
| 2015/0269559 | A1 | 9/2015 | Inotay et al. |
| 2015/0365384 | A1 | 12/2015 | Jimenez |
| 2016/0253656 | A1 | 9/2016 | Dragushan et al. |
| 2016/0300237 | A1 | 10/2016 | Khan et al. |
| 2018/0300420 | A1 | 10/2018 | Bergel et al. |
| 2019/0104410 | A1 | 4/2019 | Liu et al. |
| 2020/0128408 | A1 | 4/2020 | Liu et al. |

FOREIGN PATENT DOCUMENTS

| | | |
|---|---|---|
| CN | 104065480 | 9/2014 |
| CN | 104410603 | 3/2015 |
| CN | 104424566 | 3/2015 |
| CN | 104599112 | 5/2015 |
| CN | 104753681 | 7/2015 |
| CN | 104967997 | 10/2015 |
| CN | 105205664 | 12/2015 |
| JP | 2007524908 | 8/2007 |
| JP | 2012507916 | 3/2012 |
| JP | 2012073890 | 4/2012 |
| JP | 2014035553 | 2/2014 |
| JP | 2014092885 | 5/2014 |
| JP | 2016015102 | 1/2016 |
| JP | 2016071538 | 5/2016 |
| KR | 101296137 | 8/2013 |
| TW | 201227557 | 7/2012 |
| WO | WO 2015119339 | 8/2015 |

OTHER PUBLICATIONS

European Extended Search Report in European Patent Application No. 17809640.0, dated May 15, 2019, 7 pages.

Menezes et al, "Handbook of Applied Cryptography", CRC Press, Boca Raton, FL, USA, Chapter 13, 543-590, 1996.

Nakamoto, "Bitcoin: A Peer-to-Peer Electronic Cash System," www.bitcoin.org, 2005, 9 pages.

PCT International Preliminary Report on Patentability in International Application No. PCT/CN2017/086067 dated Dec. 11, 2018; 8 pages.

PCT International Search Report by the International Searching Authority issued in International Application No. PCT/CN2017/086067 dated Aug. 3, 2017; 8 pages.

* cited by examiner

DATA TRANSMISSION METHOD, DATA TRANSMITTER, DATA RECEIVER, AND SYSTEM

CROSS-REFERENCE TO RELATED APPLICATIONS

This application is a continuation of U.S. application Ser. No. 16/721,591, now allowed, filed on Dec. 19, 2019, which is a continuation of U.S. application Ser. No. 16/193,201, now allowed, filed on Nov. 16, 2018, which is a continuation of PCT Application No. PCT/CN2017/086067, filed on May 26, 2017, which claims priority to Chinese Patent Application No. 201610398687.8, filed on Jun. 7, 2016, and each application is hereby incorporated by reference in its entirety.

TECHNICAL FIELD

The present application relates to the field of information technologies, and in particular, to a data transmission method, a data transmitter, a data receiver, and a system.

BACKGROUND

With the rapid development and wide application of smart mobile devices such as mobile phones and tablet computers, more and more users are inclined to use smart mobile devices in daily work, life and study. Thus, there are more and more scenarios of near-field transmission between devices, such as mobile phone payment, electronic coupon discount, business card exchange, and cross-device web page navigation, etc.

At present, the most widely used method for near-field transmission between devices is as follows: A receiving device obtains data to be sent by a transmitting device by scanning an information pattern such as a quick response (QR) code or barcode displayed by the transmitting device to implement data transfer between the devices. In addition, this data transmission method allows the receiving device and the transmitting device to implement data transmission without network connection.

The previously described implementation of data transmission is simple and easy to operate. However, if the information pattern such as the QR code or the barcode in the transmitting device is obtained by a malicious user through photographing, etc., data information of the user owning the transmitting device is leaked, and the data security of the transmitting device is threatened. What's worse, if the information pattern to be sent by the transmitting device includes asset transaction information, the malicious user can perform asset transaction through the stolen information pattern, bringing unnecessary economic loss to the user of the transmitting device.

SUMMARY

In view of this, the implementations of the present application provide a data transmission method, a data transmitter, a data receiver, and a system. The present application is mainly intended to prevent pattern information in a transmitter device from being leaked, thereby ensuring data information security of the user of the transmitter.

To achieve the previously described objective, the following technical solutions are provided in the present application:

According to a first aspect, the present application provides a data transmission method, and the data transmission method includes: monitoring, by a data transmitter, sound wave information including predetermined security information within a predetermined distance; parsing the sound wave information and obtaining the predetermined security information in the sound wave information; generating pattern information based on the predetermined security information and data information that is to be sent; and outputting and displaying the pattern information so that a data receiver can obtain the pattern information.

According to a second aspect, the present application provides a data transmission method, and the data transmission method includes generating, by a data receiver, sound wave information including predetermined security information and broadcasting the sound wave information; obtaining pattern information displayed by a data transmitter, where the pattern information includes data information and predetermined security information that is to be checked; authenticating the predetermined security information that is to be checked in the pattern information; and obtaining the data information in the pattern information if the authentication of the predetermined security information that is to be checked succeeds.

According to a third aspect, the present application provides a data transmitter, and the data transmitter includes: a monitoring unit, configured to monitor sound wave information including predetermined security information within a predetermined distance; a parsing unit, configured to parse the sound wave information when the monitoring unit detects the sound wave information including the predetermined security information within the predetermined distance; an acquisition unit, configured to obtain the predetermined security information in the sound wave information in the process in which the parsing unit parses the sound wave information; a generating unit, configured to generate pattern information based on the predetermined security information obtained by the acquisition unit and data information that is to be sent; and an output display unit, configured to output display the pattern information generated by the generating unit so that a data receiver can obtain the pattern information.

According to a fourth aspect, the present application provides a data receiver, and the data receiver includes: a generating unit, configured to generate sound wave information including predetermined security information; a broadcast unit, configured to broadcast the sound wave information generated by the generating unit; a first acquisition unit, configured to obtain pattern information displayed by a data transmitter, where the pattern information includes data information and predetermined security information that is to be checked; an authentication unit, configured to authenticate the predetermined security information that is to be checked and obtained by the first acquisition unit; and a second acquisition unit, configured to obtain the data information in the pattern information if the authentication unit determines that the authentication of the predetermined security information that is to be checked succeeds.

According to a fifth aspect, the present application provides a data transmission system. The system includes the previously described data transmitter and the previously described data receiver.

With the above technical solutions, the technical solutions provided by the implementations of the present application have at least the following advantages:

According to the data transmission method, the data transmitter, the data receiver, and the system provided in the present application, before the data transmitter transmits the data to the data receiver, the data transmitter first monitors the sound wave information including the predetermined security information within the predetermined distance, parses the detected sound wave information, and obtains the predetermined security information in the sound wave information. Then the data transmitter generates the pattern information based on the predetermined security information obtained and the data information that is to be sent. Finally the data transmitter outputs and displays the pattern information after generating the pattern information so that the data receiver authenticates the predetermined security information in the sound wave information. Compared with the existing technology, the pattern information generated by the data transmitter in the implementation of the present application includes the predetermined security information generated by the data receiver. The predetermined security information is generated by the data receiver based on a predetermined transmission period. Predetermined security information sent in different predetermined transmission periods is different. As such, the pattern information including the predetermined security information sent by the data transmitter dynamically changes. After the data receiver authenticates the predetermined security information in the pattern information, secure data transmission can be performed. The pattern information in the data transmitter is prevented from being stolen by a malicious user, thereby ensuring the security of the data information of the user of the data transmitter.

The previous description is only an overview of the technical solutions of the present application. To facilitate better understanding of the technical solutions of the present application so that the technical solutions can be implemented according to the content of the specification, and to make other objectives, features and advantages of the present application more clear, specific implementations of the present application are set forth in the following.

BRIEF DESCRIPTION OF DRAWINGS

By reading the following detailed description of the preferred implementations, a variety of other advantages and benefits will become apparent to a person of ordinary skill in the art. The drawings are merely used to illustrate the preferred implementations and are not intended to limit the present application. In the drawings, the same components are denoted by the same reference numerals. In the drawings.

DESCRIPTION OF IMPLEMENTATIONS

Figure 1:
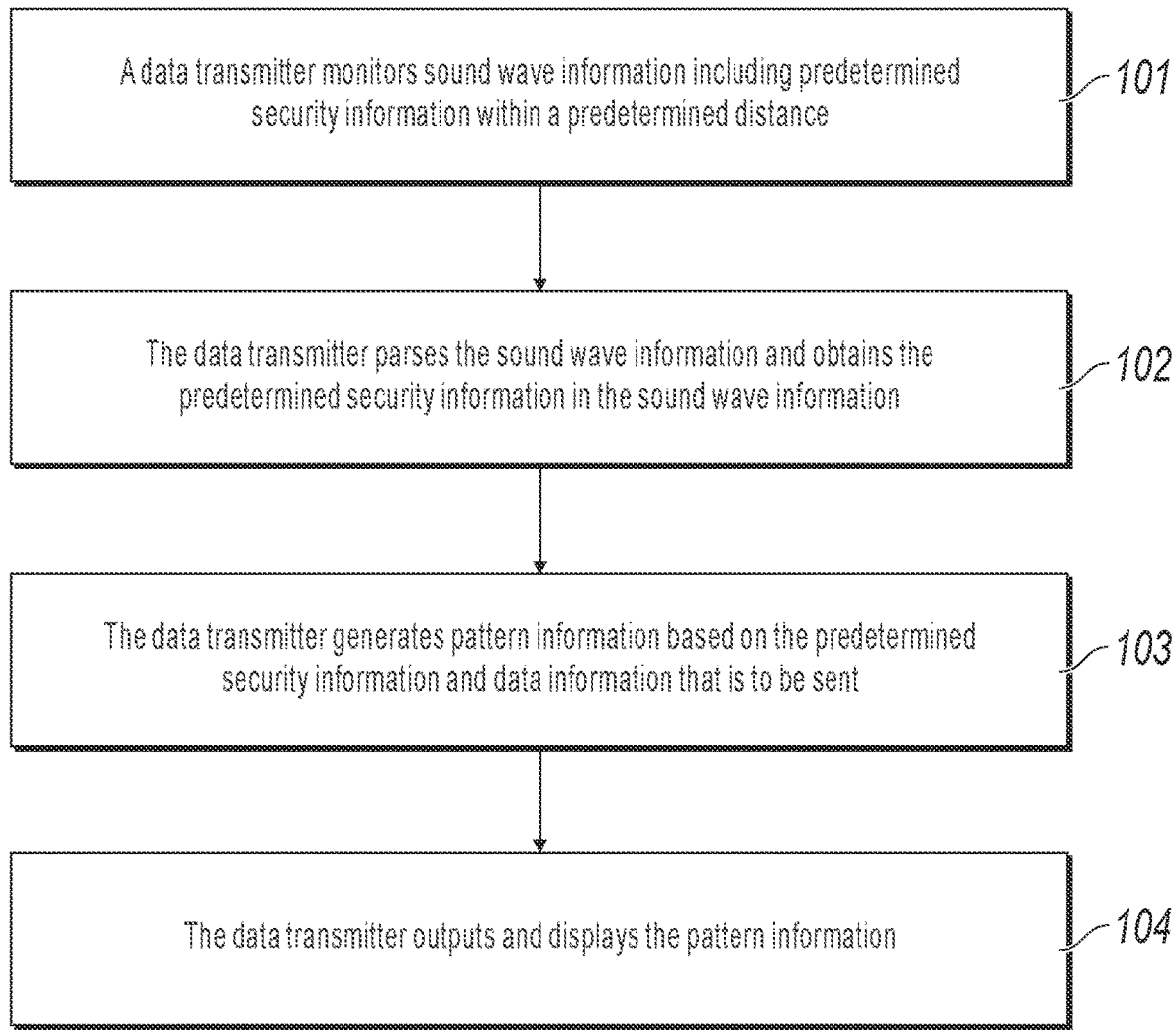
FIG. 1 is a flowchart illustrating a data transmission method, according to an implementation of the present application.

Example implementations of the present disclosure are described in more detail below with reference to the accompanying drawings. Although the example implementations of the present disclosure are shown in the drawings, it should be understood that the present disclosure can be implemented in various forms and should not be limited by the implementations illustrated here. On the contrary, these implementations are provided so that the present disclosure can be fully understood, and the scope of the present disclosure can be fully conveyed to a person skilled in the art.

An implementation of the present application provides a data transmission method. The method is applied to a data transmitter. As shown in FIG. 1, the method includes the following steps:

101. The data transmitter monitors sound wave information including predetermined security information within a predetermined distance.

When the data transmitter and a data receiver perform near-field transmission, in order to ensure the security of the transmitted data, the data transmitter usually adds predetermined security information for identity security authentication during the data transmission process. The predetermined security information is used as a certificate for establishing "trusted" data transmission between the data receiver and the data transmitter. Before receiving the data sent by the data transmitter, the data receiver assesses the validity and security of the predetermined security information to ensure security of the data information sent by the data transmitter. The predetermined security information can include but is not limited to the following content: dynamic password information, time information, random code information, etc. The implementation of the present application imposes no limitation to the predetermined security information.

In the implementation of the present application, when the data transmitter and the data receiver perform near-field transmission, the data receiver acts as a sound source entity, loads the predetermined security information to the sound wave information, and broadcasts the sound wave information in all directions by using air as a medium so that the data transmitter can obtain the predetermined security information in the sound wave information. In actual applications, because the sound wave loses energy during the transmission process, the data transmitter can detect and receive the sound wave information only within the predetermined distance of the broadcast sound wave. In addition, there is a predetermined scan distance when the data transmitter detects, through scanning, whether sound wave information exists near the data transmitter. In other words, the data transmitter can scan sound wave information only within the predetermined distance. Therefore, the data transmitter can detect the sound wave information only when the following two necessary conditions are both met: first, within the predetermined distance of the sound wave broadcast by the data receiver; second, within the predetermined distance within which the data transmitter can scan sound wave information.

Figure 2:
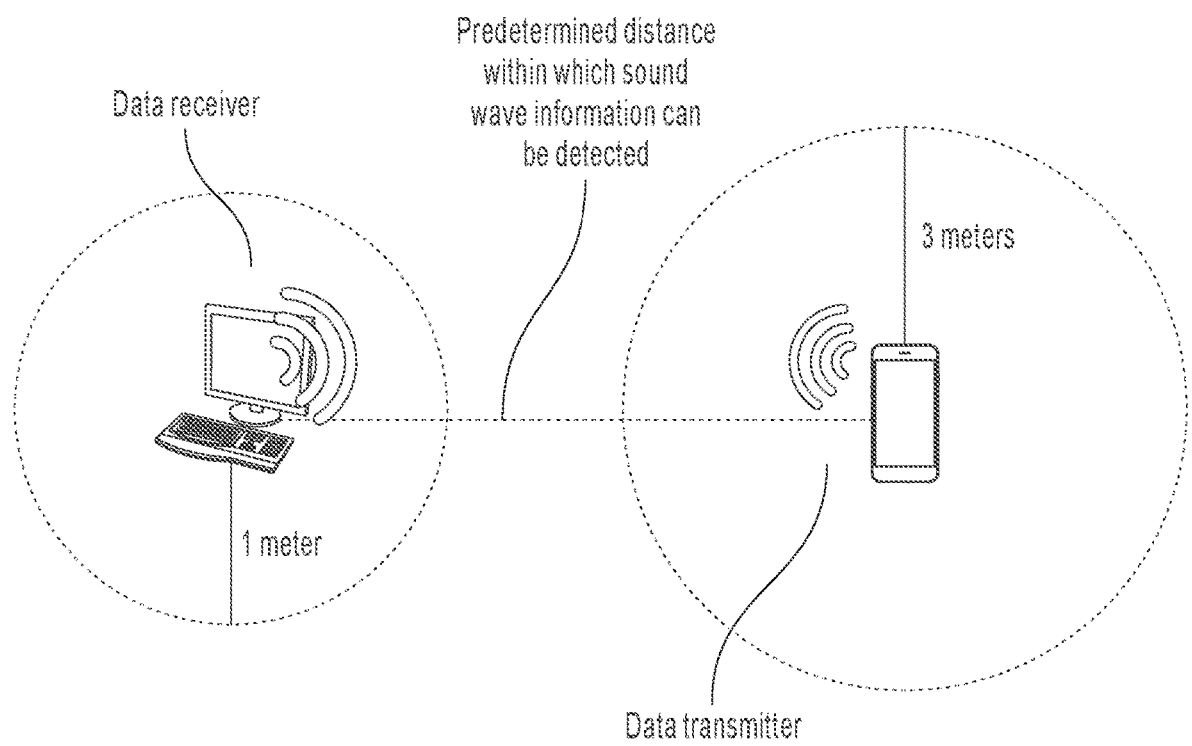
FIG. 2 is a schematic diagram illustrating a scenario in which a data transmitter monitors sound wave information within a predetermined distance, according to an implementation of the present application.

For example, as shown in FIG. 2, the data transmitter is a smart phone, the data receiver is a personal computer, a predetermined distance to which the personal computer broadcasts sound wave information is 1 meter, and a predetermined distance within which the smart phone can scan sound wave information is 3 meters. In the implementation of the present application, a predetermined distance within which the smart phone can detect the sound wave information is less than or equal to 1 meter. Although the predetermined distance within which the smart phone can scan sound wave information is 3 meters, the predetermined distance to which the sound source body (the personal computer) broadcasts the sound wave information is 1 meter, when an actual distance between the sound source body (the personal computer) and the smart phone is greater than 1 meter, the smart phone will not detect the sound wave information. The actual distance between the personal computer and the smart phone needs to be shortened so that the data transmitter can obtain the sound wave information including the predetermined security information. The previously described example in which the data receiver is a personal computer and the data transmitter is a smart phone is used for ease of description. It is worthwhile to note that the description is not intended to limit the data receiver and the data transmitter in the implementation of the present application only to the personal computer and the smart phone.

The predetermined distance to which the sound wave information is broadcast depends on the maximum power at which the data receiver (sound source body) sends the sound wave information. Different data receivers broadcast sound wave information at different maximum powers. A predetermined distance to which the sound wave is broadcast is longer when the maximum power of a sound source body is larger. A predetermined distance to which a sound wave is broadcast is shorter when the maximum power of a sound source body is smaller. The predetermined distance within which the data transmitter can scan sound wave information depends on the scanning hardware of the carrier installed on the data transmitter. Alternatively, if the data transmitter has a scanning function, the predetermined distance within which sound wave information can be scanned depends on the scanning device of the data transmitter. Specific values of the predetermined distance to which the data transmitter can broadcast the sound wave information and the predetermined distance within which the data transmitter can scan sound wave information are not limited in the implementation of the present application.

When the data transmitter user expects to perform near-field transmission, the user selects the function of displaying the pattern information in the data transmitter. After the user selects the function, the data transmitter starts to monitor the sound wave information including the predetermined security information within the predetermined distance, monitors the sound wave information including the predetermined security information by using a real-time scanning method, and stops scanning when detecting the sound wave information.

In the implementation of the present application, the data transmitter includes but is not limited to a mobile end-user device such as a smart phone, a tablet computer, a personal computer, a portable computer, etc. Alternatively, the data transmitter can be a preconfigured application or client software installed in the mobile end-user device. The specific type of the data transmitter is not limited in the implementation of the present application.

102. The data transmitter parses the sound wave information and obtains the predetermined security information in the sound wave information.

The predetermined security information is used as a credit certificate for data transmission between the data transmitter and the data receiver. The data transmission continues only after the data receiver successfully authenticates the predetermined security information. The data transmitter parses the sound wave information and obtains the predetermined security information in the sound wave information based on the sound wave information detected in step 101.

The sound wave information transmitted by the data receiver is an analog signal. If the data transmitter expects to obtain the predetermined security information in the sound wave information, the data transmitter needs to convert the sound wave information from the analog signal into a digital signal. After converting the sound wave information into the digital signal, the data transmitter obtains a predetermined decoding rule for the predetermined security information, parses the sound wave information based on the predetermined decoding rule, and obtains the predetermined security information carried in the sound wave information. The predetermined security information is displayed as a plaintext. The predetermined decoding rule is a decoding rule added to the sound wave information in the process of generating the sound wave information based on the predetermined security information by the data receiver. As such, the data transmitter obtaining the sound wave information can obtain the predetermined security information based on the predetermined decoding rule.

In actual applications, in order to save the limited resources of the data transmitter, the data transmitter directly obtain the predetermined security information in the form of a digital signal, after the data transmitter obtains the sound wave information and converts the sound wave information from the analog signal into the digital signal. The predetermined security information is displayed as an undecoded ciphertext. Pattern information is generated based on the predetermined security information in the form of a digital signal in step 103. The data receiver decodes the predetermined security information based on the predetermined decoding rule, and authenticates the validity of the predetermined security information. It is worthwhile to note that the predetermined security information is loaded to the sound wave information by the data receiver, and then the data receiver decodes the predetermined security information in the pattern information. The process does not cause resource waste to the data receiver. In the implementation of the present application, whether the data transmitter decodes the sound wave information by using the predetermined decoding rule and obtains the predetermined security information is not limited.

103. The data transmitter generates pattern information based on the predetermined security information and data information that is to be sent.

After obtaining the predetermined security information, the data transmitter encodes the predetermined security information and the data information that is to be sent to generate the pattern information. The pattern information can include a QR code, a barcode, a variable barcode, etc.

In actual applications, the data information transmitted by the data transmitter by using the pattern information can include but is not limited to the following content: private account information, private file information, video information, a web address, etc. The data information that is to be sent included in the pattern information can be determined based on different application scenarios. When the application scenario is to transmit a video face to face, the generated pattern information can include predetermined security information and video information. When the application scenario is electronic payment transaction, the generated pattern information includes at least predetermined security information, private account information, key information of the account, etc. The application scenario is not limited in the present implementation.

It is worthwhile to note that, due to the differences in the development environments and programming languages of data transmitters, during generating of the pattern information, the encoding algorithm used needs to be adapted based on different development environments and programming languages. The development environment and programming language of the data transmitter are not specifically limited.

104. The data transmitter outputs and displays the pattern information.

The data transmitter outputs and displays the pattern information so that the data receiver obtains the pattern information and authenticates the predetermined security information in the pattern information to implement data transmission.

In the data transmission method provided in the implementation of the present application, before the data transmitter transmits the data to the data receiver, the data transmitter first monitors the sound wave information including the predetermined security information within the predetermined distance, parses the detected sound wave information, and obtains the predetermined security information in the sound wave information. Then the data transmitter generates the pattern information based on the predetermined security information obtained and the data information that is to be sent. Finally, the data transmitter outputs and displays the pattern information after generating the pattern information so that the data receiver authenticates the predetermined security information in the sound wave information. Compared with the existing technology, the pattern information generated by the data transmitter in the implementation of the present application includes the predetermined security information generated by the data receiver. The predetermined security information is generated by the data receiver based on a predetermined transmission period. Predetermined security information sent in different predetermined transmission periods is different. As such, the pattern information including the predetermined security information sent by the data transmitter dynamically changes. After the data receiver authenticates the predetermined security information in the pattern information, secure data transmission can be performed. The pattern information in the data transmitter is prevented from being stolen by a malicious user, thereby ensuring the security of the data information of the user of the data transmitter.

In a detailed implementation, the data transmitter usually is a mobile end-user device, and a preconfigured microphone in the mobile end-user device is an essential function of the mobile end-user device. When monitoring the sound wave information including the predetermined security information within the predetermined distance, the data transmitter invokes the preconfigured microphone to monitor the sound wave information including the predetermined security information within the predetermined distance. In other words, before transmitting the data information to the data receiver, the data transmitter activates the microphone in the data transmitter, and monitors and receives the sound wave information within the predetermined distance by using the microphone.

Optionally, in an implementation of the present application, before the data transmitter obtains the predetermined security information, the data transmitter sets a predetermined time threshold for obtaining the predetermined security information. If the predetermined security information is not successfully obtained within the predetermined time, the data transmission between the data transmitter and the data receiver is cancelled. If the predetermined security information is successfully obtained within the predetermined time, the data transmission between the data transmitter and the data receiver continues. For example, the predetermined time threshold is 60 s. If the data transmitter starts to obtain the predetermined security information at 14:30:02 and cannot successfully obtain the predetermined security information at 14:31:02, the data transmitter cancels or interrupts data transmission to the data receiver. The previous description is merely an example. Settings of the predetermined time threshold are not limited in the implementation of the present application.

The generating the pattern information based on the predetermined security information and the data information that is to be sent specifically includes generating, by using a predetermined coding algorithm, the pattern information based on the predetermined security information and the data information that is to be sent. In actual applications, the predetermined coding algorithm can be a coding algorithm executed on a back end of the data transmitter. Alternatively, the predetermined coding algorithm can be a third-party QR code generating application invoked by the data transmitter, and the third-party QR code generating application generates a QR code based on the predetermined security information and the data information that is to be sent. It should be understood that the above description takes the case where the pattern information is a QR code as an example, and the description is not intended to limit the pattern information to only a QR code.

Figure 3:
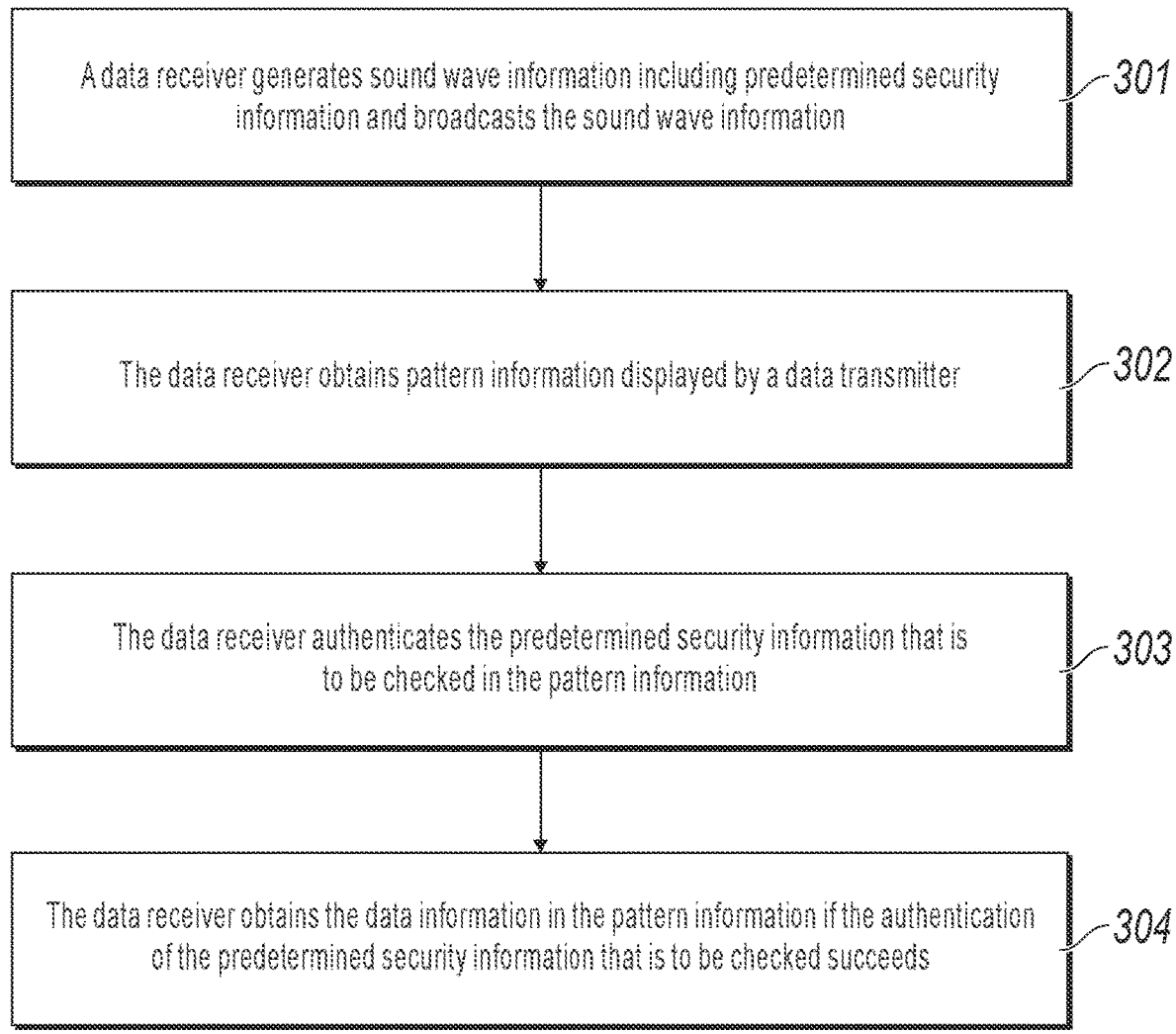
FIG. 3 is a flowchart illustrating a second data transmission method, according to an implementation of the present application.

The implementation of the present application further provides another data transmission method. The method is applied to the data receiver. As shown in FIG. 3, the method includes the following steps.

301. The data receiver generates sound wave information including predetermined security information and broadcasts the sound wave information.

In the implementation of the present application, the data receiver transmits the predetermined security information to the data transmitter by transmitting the sound wave information. The predetermined security information is carried in the sound wave information. During the broadcast of the sound wave information, if the data transmitter detects the sound wave information, the data transmitter can parse the sound wave information to obtain the predetermined security information and use the predetermined security information as a certificate for establishing "trusted" data transmission between the data receiver and the data transmitter.

When the data receiver encodes the predetermined security information to the sound wave information, the data receiver uses a predetermined coding rule to encode the predetermined security information to the sound wave information. In an implementation of the present application, before broadcasting the sound wave information, the data receiver configures a predetermined decoding rule corresponding to the predetermined coding rule in the sound wave information, so that the data transmitter obtains the predetermined decoding rule after converting the sound wave information from the analog signal into the digital signal, and uses the predetermined decoding rule to parse the predetermined security information in the sound wave information. The data transmitter generates pattern information by using the decoded predetermined security information so that the data receiver authenticates the validity of the predetermined security information. The data receiver can determine the validity and legitimacy of the predetermined security information without decoding the predetermined security information.

In another implementation of the implementation of the present application, before broadcasting the sound wave information, the data receiver does not configure the predetermined decoding rule corresponding to the predetermined coding rule in the sound wave information. When the data transmitter receives the sound wave information, the data transmitter obtains the undecoded predetermined security information and uses the undecoded predetermined security information to generate the pattern information. The data receiver obtains the predetermined security information in the pattern information of the data transmitter and determines that the predetermined security information is undecoded. The data receiver first decodes the obtained predetermined security information based on the predetermined decoding rule corresponding to the predetermined security information, and then authenticates the validity of the predetermined security information.

For ease of description, an example in which time information carried in the sound wave information is the predetermined security information is used for description. For example, the data receiver generates sound wave information including time information and broadcasts the sound wave information, and sets the period for broadcasting the sound wave information to 5 minutes before the broadcast or sets the period for broadcasting the sound wave information to 10 minutes, etc. The time information carried in the sound wave information is the current time information of the data receiver. If the data receiver broadcasts the sound wave information at 08:00 for the first time, the predetermined security information in the sound wave information is 08/00. Alternatively, if the data receiver broadcasts the sound wave information at 08:10 for the first time, the predetermined security information in the sound wave information is 08/10. For convenience of description, the previously described implementation of the present application uses the current time information of the data receiver as the predetermined security information, but it should be clarified that the description is not intended to limit the predetermined security information described in the implementation of the present application to only the current time information of the data receiver.

302. The data receiver obtains pattern information displayed by the data transmitter.

The pattern information includes data information and the predetermined security information that is to be checked.

The method for obtaining the pattern information displayed by the data transmitter can be but is not limited to, for example, obtaining the pattern information displayed by the data transmitter based on a predetermined data acquisition instruction. The methods for implementing the predetermined data acquisition instruction include a scanning method, a method of shaking the data transmitter, a button triggering method, a voice triggering method, and a track sliding method.

Among the methods for implementing the predetermined data acquisition instruction in the implementation of the present application, except the scanning method, other methods for implementing the predetermined data acquisition instruction need to be set before data transmission. For example, the method of shaking the data transmitter is set as follows: shaking twice in the same single direction, shaking left and right twice, shaking up and down three times, etc. The button triggering method includes that the data receiver monitors a triggering status of a predetermined button. The predetermined button can be a physical button or a virtual button. When the data transmitter triggers the predetermined button, the data receiver obtains the pattern information displayed on the data transmitter. For a data transmitter with a touch screen, after the data receiver sets a track sliding method in advance, the data receiver monitors a sliding status of the touch screen in the data transmitter, and when the user of the data transmitter triggers a slide operation on the screen, the data receiver obtains the pattern information. The above is a description of the predetermined data acquisition instruction. The type of the predetermined data acquisition instruction in actual applications is not limited in the implementation of the present application.

303. The data receiver authenticates the predetermined security information that is to be checked in the pattern information.

The process in which the data receiver authenticates the predetermined security information that is to be checked is the basis for establishing trusted data transmission between the data receiver and the data transmitter. If the authentication of the predetermined security information that is to be checked succeeds, step 304 is performed. If the authentication of the predetermined security information that is to be checked fails, the pattern information including the data information is ignored.

Based on the example in step 301, assume that the data receiver broadcasts the predetermined security information at 15:20 on Feb. 12, 2016, and the predetermined transmission period is set to 10 minutes, the data transmitter displays the pattern information at 15:25 on Feb. 12, 2016, and the predetermined security information in the pattern information is 15/20. After obtaining the pattern information, the data receiver parses the pattern information and obtains the predetermined security information 15/20. It indicates that the predetermined security information received by the data transmitter is the latest predetermined security information broadcast by the data receiver, and the predetermined security information is successfully authenticated. After the predetermined security information is successfully authenticated, authentication is performed on the data information in the pattern information. If the data transmitter displays the pattern information at 15:23 on Feb. 12, 2016, the predetermined security information in the pattern information is 15/18, and the latest time at which the data receiver broadcasts the predetermined security information is 15:20 on Feb. 12, 2016, it indicates that the predetermined security information 15/18 in the pattern information does not meet the requirement. Thus, here is risk that the pattern information is stolen by a malicious user, and therefore the pattern information that does not meet the requirement is ignored. It is worthwhile to note that the previous description is only an exemplary example, and the type and specific content of the predetermined security information are not limited in the implementation of the present application.

304. The data receiver obtains the data information in the pattern information if the authentication of the predetermined security information that is to be checked succeeds.

In the data transmission method provided in the implementation of the present application, before the data transmitter transmits the data to the data receiver, the data transmitter first monitors the sound wave information including the predetermined security information within the predetermined distance, parses the detected sound wave information, and obtains the predetermined security information in the sound wave information. Then the data transmitter generates the pattern information based on the predetermined security information obtained and the data information that is to be sent. Finally the data transmitter outputs and displays the pattern information after generating the pattern information so that the data receiver authenticates the predetermined security information in the sound wave information. Compared with the existing technology, the pattern information generated by the data transmitter in the implementation of the present application includes the predetermined security information generated by the data receiver. The predetermined security information is generated by the data receiver based on a predetermined transmission period. Predetermined security information sent in different predetermined transmission periods is different. As such, the pattern information including the predetermined security information sent by the data transmitter dynamically changes. After the data receiver authenticates the predetermined security information in the pattern information, secure data transmission can be performed. The pattern information in the data transmitter is prevented from being stolen by a malicious user, thereby ensuring the security of the data information of the user of the data transmitter.

The method used by the data receiver to generate the sound wave information including the predetermined security information can include but is not limited to invoking a preselected sound wave generator and generating the sound wave information based on the preselected sound wave generator. If the data receiver has a preconfigured sound wave generating module, the data receiver invokes the preconfigured sound wave generating module and generates the sound wave information based on the preconfigured sound wave generating module. The preconfigured sound wave generating module includes the preselected sound wave generator. If the data receiver has no preconfigured sound wave generating module, the data receiver invokes a third party sound wave generator and generates the sound wave information based on the third party sound wave generator.

After generating the sound wave information, the data receiver needs to broadcast the predetermined security information carried in the sound wave information, so that the data transmitter can obtain the predetermined security information. The data receiver broadcasts the predetermined security information carried in the sound wave information. The data receiver encodes the predetermined security information to the sound wave information by using a predetermined modulation scheme and broadcasts the predetermined security information that is encoded and carried in the sound wave information based on a predetermined transmission period by using air as a medium. The purpose of encoding the predetermined security information by using the predetermined modulation scheme is to place the predetermined security information in the sound wave information for convenient transmission or processing.

In order to ensure the security of the data information of the data transmitter, the data receiver can only receive the data sent by the data transmitter after successfully authenticating the predetermined security information that is to be checked in the pattern information. If the authentication of the predetermined security information that is to be checked in the pattern information is unsuccessful, it indicates that the data information in the data transmitter is likely to be leaked or stolen, and the data receiver does not receive the data information sent by the data transmitter. Therefore, the authentication of the predetermined security information that is to be checked is the basis for ensuring data security of the data transmitter. That the data receiver authenticates the predetermined security information that is to be checked includes the following steps: obtain the predetermined security information after the preconfigured sound wave generating module or the third party sound wave generator sends the predetermined security information, parse the pattern information and obtain the predetermined security information that is to be checked in the pattern information, compare the predetermined security information and the predetermined security information that is to be checked, and if the predetermined security information and the predetermined security information that is to be checked are consistent, determine that the authentication of the predetermined security information that is to be checked succeeds, or if the predetermined security information and the predetermined security information that is to be checked are inconsistent, determine that the authentication of the predetermined security information that is to be checked fails and ignore the pattern information including the data information.

In actual applications, when the data security requirement is high in the data transmission process, after the data receiver has authenticated the predetermined security information in the data transmitter, the data receiver further needs to authenticate the data information in the pattern information. For example, if the data information is private file information, authentication needs to be performed on the attribute of a hardware device of the data transmitter for the private file information, such as the name of the device model corresponding to the data transmitter. If the data information is capital transfer information, the data receiver needs to send a notification message to the server corresponding to the data transmitter so that the server authenticates the identity of the data transmitter. In the data transmission process, when the data security requirement is relatively low, after the data receiver has successfully authenticated the predetermined security information in the data transmitter, the data receiver can directly obtain the data information included in the pattern information.

It is worthwhile to note that in the implementation of the present application, when near-field transmission is performed between the data transmitter and the data receiver, the security of the pattern information needs to be confirmed by using the predetermined security information in the sound wave information, and after the authentication of the reliability of the pattern information succeeds, the data transmission continues. Because the predetermined security information in the pattern information dynamically changes, the pattern information displayed on the data transmitter dynamically changes accordingly. In actual applications, it can be considered that the pattern information displayed on the data transmitter changes in real time. Even if the pattern information is stolen by a malicious user, it will not harm the interests of the user.

Figure 4:
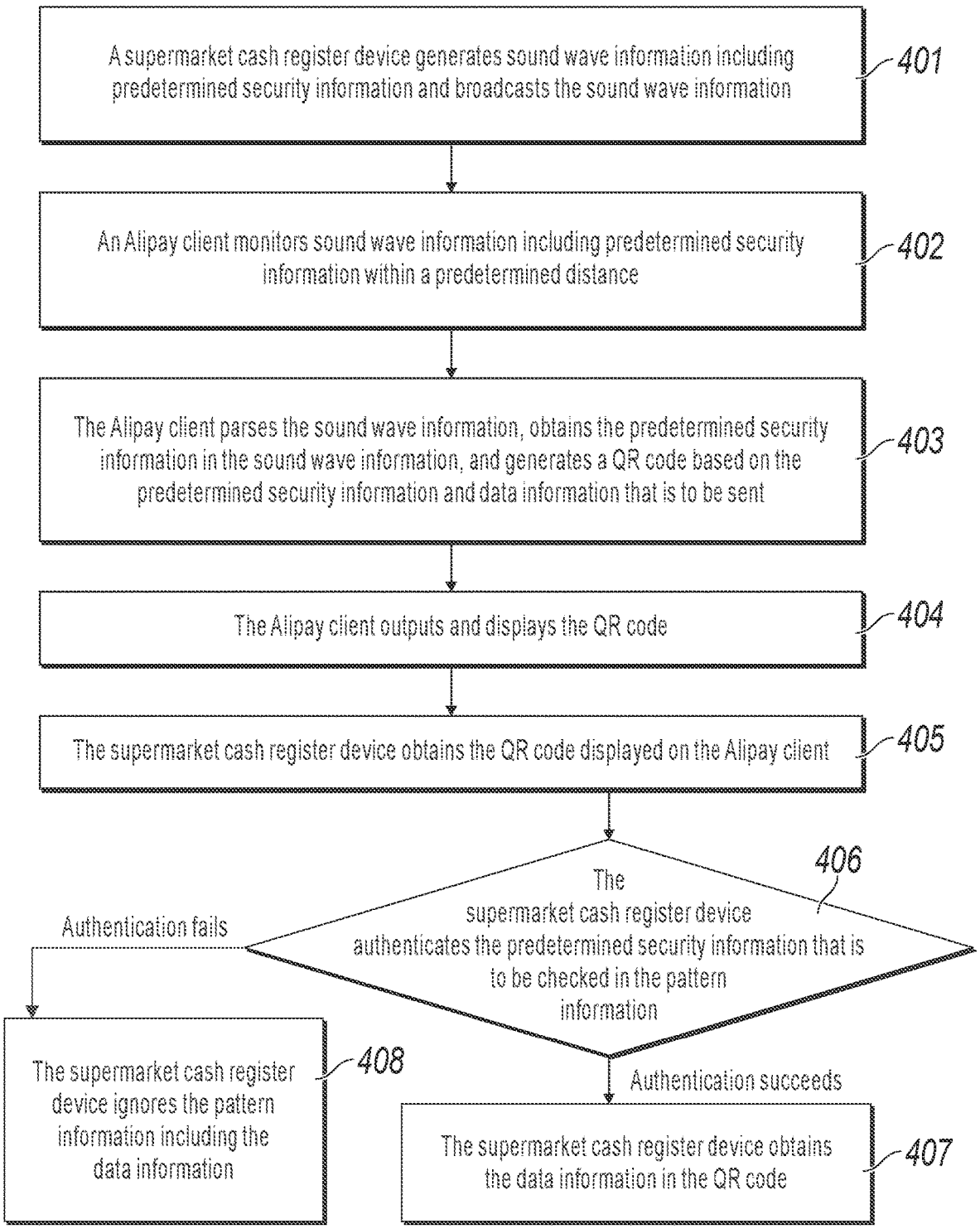
FIG. 4 is a flowchart illustrating a third data transmission method, according to an implementation of the present application.

The process of data transmission between the data transmitter and the data receiver is described above in detail. The implementation of the present application further provides a data transmission method. In the method, an application scenario of using a QR code for face-to-face electronic payment is used as an example for description. For convenience of description, that the data transmitter is the ALIPAY client installed in a mobile phone of the user A and the data receiver is a supermarket cash register device is used as an example for description. It should be understood that the description is not intended to limit the data transmitter and the data receiver in the implementation of the present application to only the ALIPAY client installed in the mobile phone and the supermarket cash register device. As shown in FIG. 4, a main procedure for the scenario includes the following steps.

401. The supermarket cash register device generates sound wave information including predetermined security information and broadcasts the sound wave information.

The supermarket cash register device invokes its own sound wave generating module and generates the sound wave information based on the sound wave generating module. Each piece of sound wave information includes predetermined security information. In the present application scenario, the predetermined security information is the current time for generating the sound wave information by the supermarket cash register device, a predetermined distance to which the sound wave information can be broadcast at the maximum power of the supermarket cash register device for transmitting the sound wave information is 80 cm, and a period for broadcasting the sound wave information of the supermarket cash register device is 3 minutes. Assume that the last time the supermarket cash register device sends sound wave information is 11:05, and the predetermined security information in the sound wave information is 11/05.

402. The ALIPAY client monitors sound wave information including predetermined security information within a predetermined distance.

Figure 5:
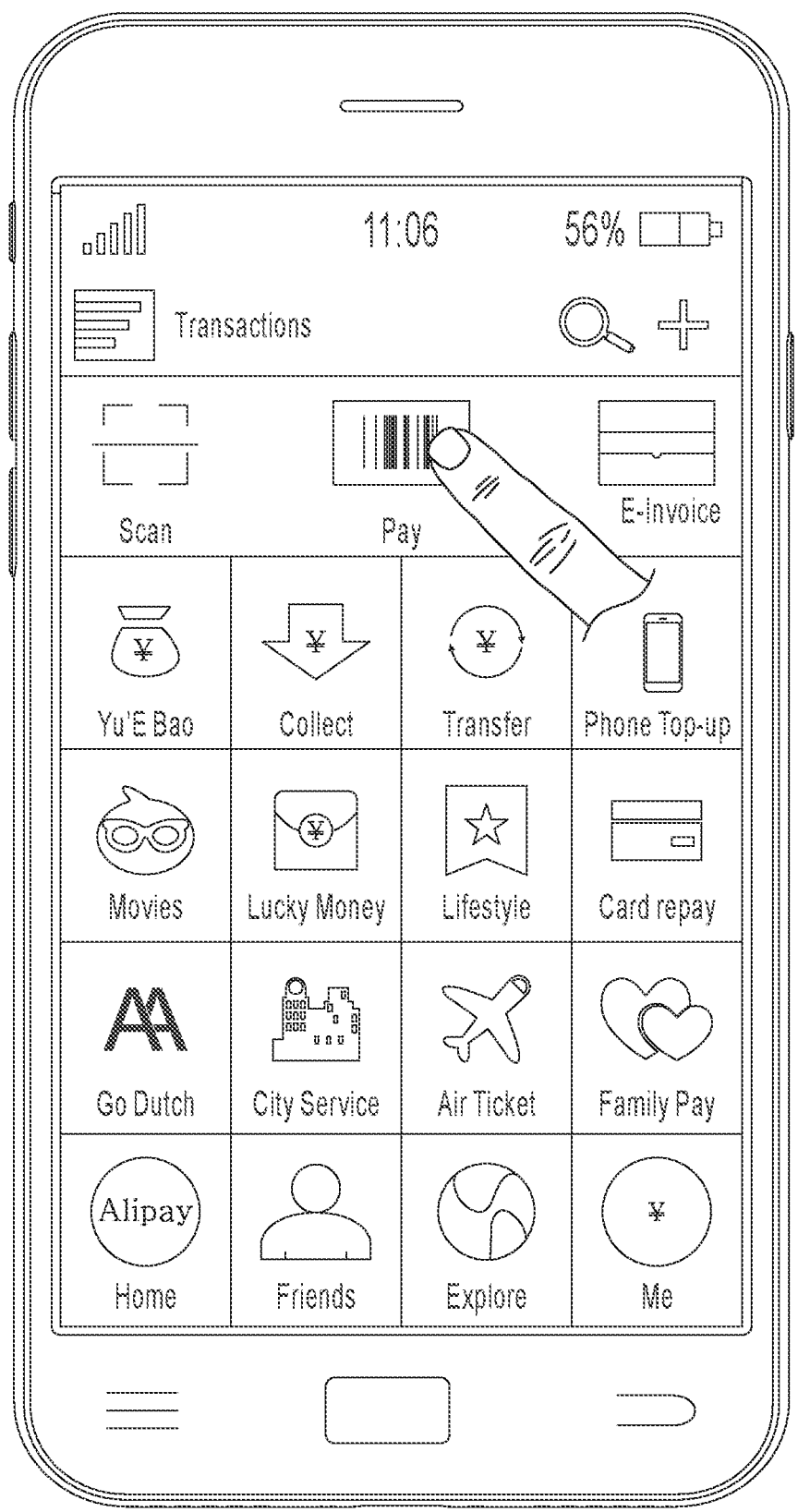
FIG. 5 is a schematic diagram illustrating an ALIPAY client home page displayed on a mobile phone, according to an implementation of the present application.

When user A makes an electronic payment for a product by using the ALIPAY client, user A first triggers an ALIPAY client start command to start the ALIPAY client. As shown in FIG. 5, at the current time of 11:06, the user A taps the payment option in the homepage of the ALIPAY client, and when the user A triggers the payment function, the ALIPAY client invokes the microphone in the mobile phone and monitors the sound wave information including the predetermined security information within the predetermined distance by using the microphone. It is worthwhile to note that in the application scenario, the mobile phone in which the ALIPAY client is installed needs to be in an online state.

403. The ALIPAY client parses the sound wave information, obtains the predetermined security information in the sound wave information, and generates a QR code based on the predetermined security information and data information that is to be sent.

The ALIPAY client parses the sound wave information detected in step 402, determines that the predetermined security information included in the sound wave information is 11/05, and generates the QR code based on the predetermined security information, the ALIPAY account information, and key information.

404. The ALIPAY client outputs and displays the QR code.

Figure 6:
FIG. 6 is a schematic diagram illustrating a QR code displayed during electronic payment transactions, according to an implementation of the present application.

The pattern information is a QR code in the present application scenario. When the ALIPAY client generates the pattern information, the ALIPAY client displays the QR code on the mobile phone so that the supermarket cash register device can scan and recognize the information included in the QR code. As shown in FIG. 6, FIG. 6 is a schematic diagram illustrating a QR code displayed during electronic payment transaction, according to an implementation of the present application. A representation form of the pattern information in the ALIPAY client is not limited.

405. The supermarket cash register device obtains the QR code displayed on the ALIPAY client.

The supermarket cash register device scans and recognizes the pattern information displayed on the ALIPAY client based on its own scan identification gun and obtains the predetermined security information in the QR code.

406. The supermarket cash register device authenticates the predetermined security information that is to be checked in the pattern information.

If the authentication of the predetermined security information that is to be checked succeeds, step 407 is performed. If the authentication of the predetermined security information that is to be checked fails, step 408 is performed.

The predetermined security information in the latest broadcast sound wave information obtained by the supermarket cash register device from its database is 11/05, and if the predetermined security information included in the QR code is also 11/05, it is determined that the current data transmission is secure. If the predetermined security information included in the QR code is not 11/05, it is determined that a threat is likely to be imposed to the security of the user's data information in the current data transmission.

407. The supermarket cash register device obtains the data information in the QR code.

In the present implementation, because the transmitted data information is the user's funds and the user's private data information is involved, in order to ensure the security of the user A's private information, before the data information is transmitted to the supermarket cash register device, a server corresponding to the ALIPAY client needs to send a text message authentication code to the mobile phone bound to the ALIPAY client. After the verification of the text message authentication code succeeds, the near-field transmission is completed.

408. The supermarket cash register device ignores the pattern information including the data information.

As an implementation of the method shown in FIG. 1, another implementation of the present application further provides a data transmitter. The apparatus implementation corresponds to the previously described method implementation. For convenience of reading, detailed content in the previously described method implementation is not described in the implementation of the present application, but it should be clear that the device in the present implementation can implement all the content in the previously described method implementation.

Figure 7:
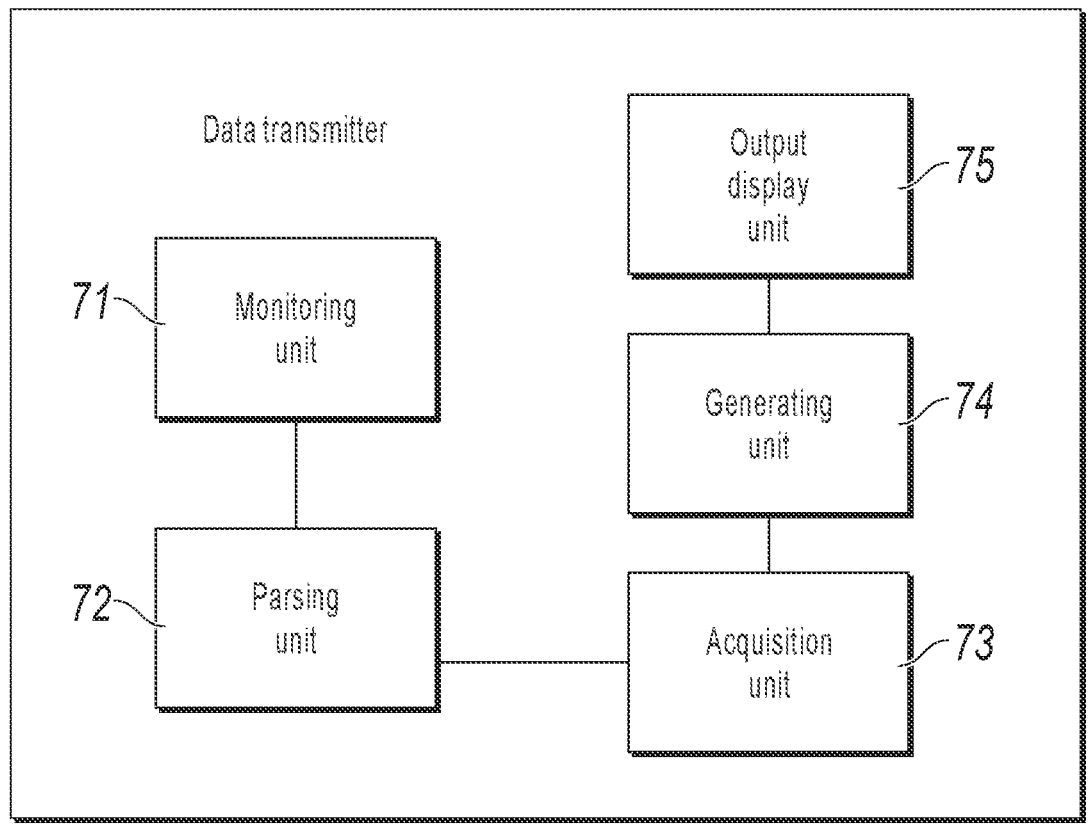
FIG. 7 is a block diagram illustrating composition of a data transmitter, according to an implementation of the present application.

The implementation of the present application provides a data transmitter. As shown in FIG. 7, the data transmitter includes: a monitoring unit 71, configured to monitor sound wave information including predetermined security information within a predetermined distance; a parsing unit 72, configured to parse the sound wave information when the monitoring unit 71 detects the sound wave information including the predetermined security information within the predetermined distance; an acquisition unit 73, configured to obtain the predetermined security information in the sound wave information in the process in which the parsing unit 72 parses the sound wave information; a generating unit 74, configured to generate pattern information based on the predetermined security information obtained by the acquisition unit 73 and data information that is to be sent; and an output display unit 75, configured to output display the pattern information generated by the generating unit 74, so that a data receiver can obtain the pattern information.

The monitoring unit 71 is further configured to invoke a preselected microphone to monitor the sound wave information including the predetermined security information within the predetermined distance.

Figure 8:
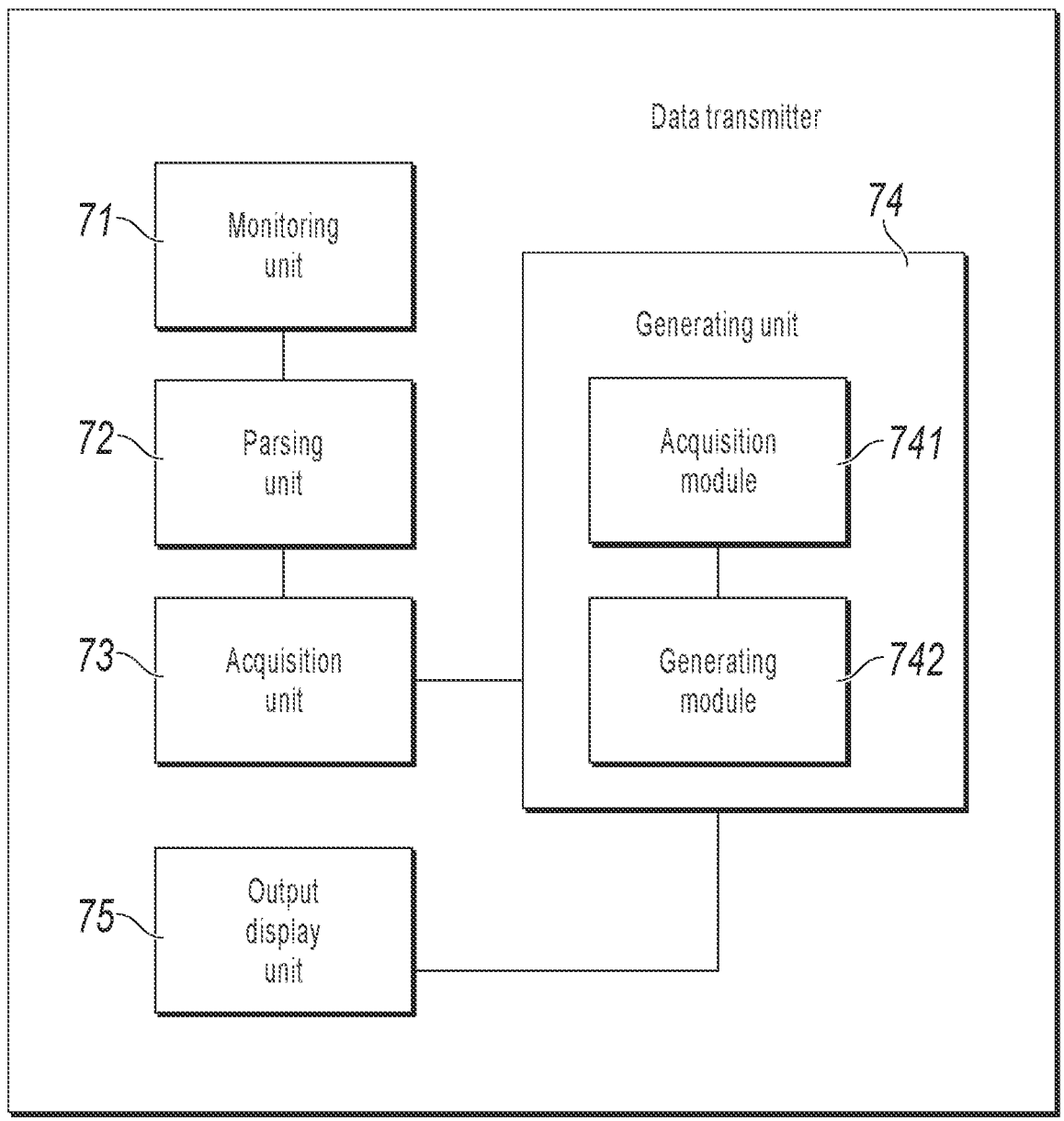
FIG. 8 is a block diagram illustrating composition of another data transmitter, according to an implementation of the present application.

As shown in FIG. 8, the generating unit 74 further includes an acquisition module 741, configured to obtain the data information that is to be sent; and a generating module 742, configured to generate, by using a predetermined coding algorithm, the pattern information based on the predetermined security information and the data information that is to be sent and obtained by the acquisition module 741.

Figure 9:
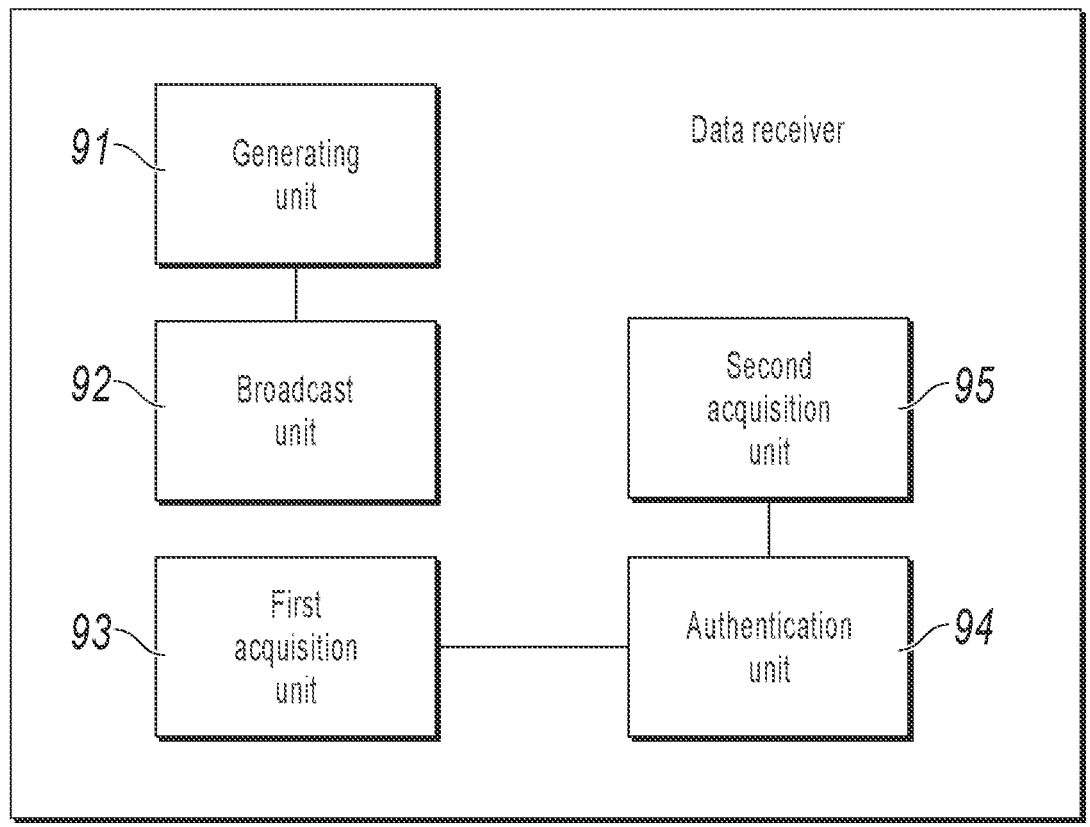
FIG. 9 is a block diagram illustrating composition of a data receiver, according to an implementation of the present application.

An implementation of the present application provides a data receiver. As shown in FIG. 9, the data receiver includes a generating unit 91, configured to generate sound wave information including predetermined security information; a broadcast unit 92, configured to broadcast the sound wave information generated by the generating unit 91; a first acquisition unit 93, configured to obtain pattern information displayed by a data transmitter, where the pattern information includes data information and predetermined security information that is to be checked; an authentication unit 94, configured to authenticate the predetermined security information that is to be checked and obtained by the first acquisition unit 93; and a second acquisition unit 95, configured to obtain the data information in the pattern information if the authentication unit 94 determines that the authentication of the predetermined security information that is to be checked succeeds.

The generating unit 91 invokes a preselected sound wave generator and generates the sound wave information including the predetermined security information based on the preselected sound wave generator.

Figure 10:
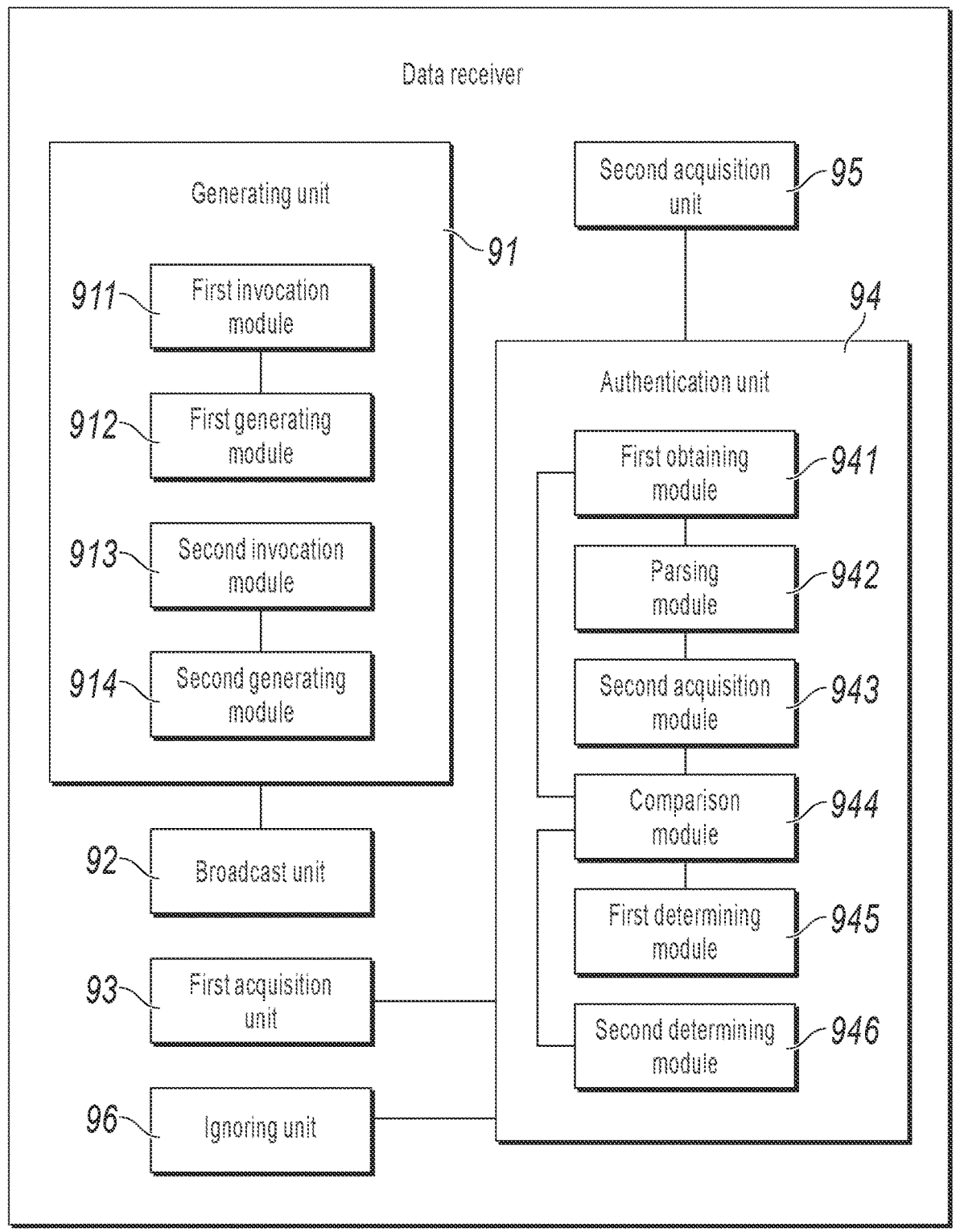
FIG. 10 is a block diagram illustrating composition of another data receiver, according to an implementation of the present application.

As shown in FIG. 10, the generating unit 91 further includes a first invocation module 911, configured to invoke a preconfigured sound wave generating module in the data receiver, where the preconfigured sound wave generating module includes the preselected sound wave generator; a first generating module 912, configured to generate the sound wave information including the predetermined security information based on the preconfigured sound wave generating module invoked by the first invocation module 911; a second invocation module 913, configured to invoke a third party sound wave generator; and a second generating module 914, configured to generate the sound wave information including the predetermined security information based on the third party sound wave generator invoked by the second invocation module 913.

As shown in FIG. 10, the generating unit 91 encodes the predetermined security information to the sound wave information by using a predetermined modulation scheme.

The broadcast unit 92 broadcasts the sound wave information encoded by the generating unit 91 based on a predetermined transmission period, where predetermined security information in sound wave information sent based on different transmission periods is different.

As shown in FIG. 10, the authentication unit 94 further includes a first acquisition module 941, configured to obtain the predetermined security information after the preconfigured sound wave generating module or the third party sound wave generator sends the sound wave information including the predetermined security information; a parsing module 942, configured to parse the pattern information obtained by the first acquisition module 941; a second acquisition module 943, configured to obtain the predetermined security information that is to be checked in the pattern information in the process in which the parsing module 942 parses the pattern information; a comparison module 944, configured to compare the predetermined security information obtained by the first acquisition module 941 and the predetermined security information that is to be checked and obtained by the second acquisition module 943; a first determining module 945, configured to determine that the authentication of the predetermined security information that is to be checked succeeds if the comparison module 944 determines that the predetermined security information and the predetermined security information that is to be checked are consistent; and a second determining module 946, configured to determine that the authentication of the predetermined security information that is to be checked fails if the comparison module 944 determines that the predetermined security information and the predetermined security information that is to be checked are inconsistent.

As shown in FIG. 10, the data receiver further includes an ignoring unit 96, configured to ignore the pattern information including the data information, if the authentication unit 94 determines that the authentication of the predetermined security information that is to be checked fails.

The first acquisition unit 93 obtains the pattern information displayed by the data transmitter based on a predetermined data acquisition instruction. Methods for implementing the predetermined data acquisition instruction include a scanning method, a method of shaking the data transmitter, a key triggering method, a voice triggering method, and a track sliding method.

Figure 11:
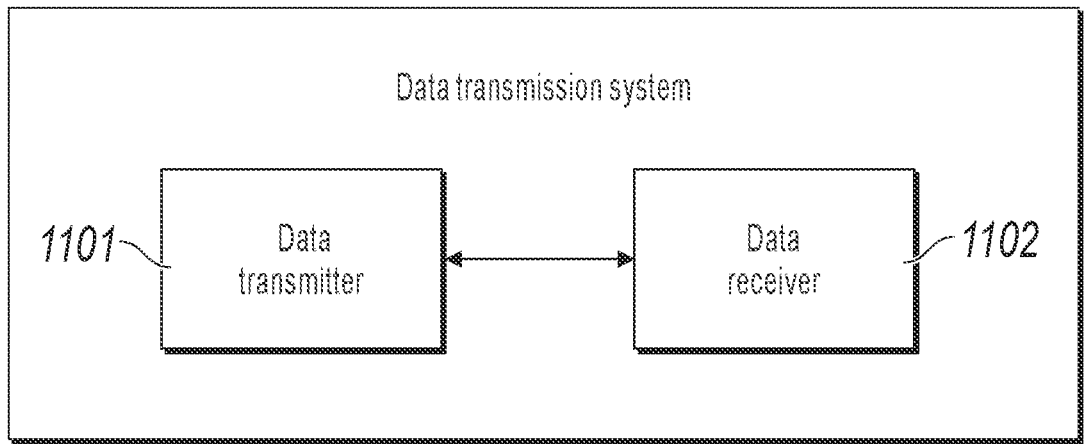
FIG. 11 is a block diagram illustrating composition of a data transmission system, according to an implementation of the present application.

The implementations of the present application further provide a data transmission system. As shown in FIG. 11, the system includes the data transmitter 1101 shown in either of FIG. 7 or FIG. 8, and the data receiver 1102 shown in either of FIG. 9 or FIG. 10.

According to the data transmitter, the data receiver, and the data transmission system provided in the implementation of the present application, before the data transmitter transmits the data to the data receiver, the data transmitter first monitors the sound wave information including the predetermined security information within the predetermined distance, parses the detected sound wave information, and obtains the predetermined security information in the sound wave information. Then the data transmitter generates the pattern information based on the predetermined security information obtained and the data information that is to be sent. Finally the data transmitter outputs and displays the pattern information after generating the pattern information so that the data receiver authenticates the predetermined security information in the sound wave information. Compared with the existing technology, the pattern information generated by the data transmitter in the implementation of the present application includes the predetermined security information generated by the data receiver. The predetermined security information is generated by the data receiver based on a predetermined transmission period. Predetermined security information sent in different predetermined transmission periods is different. As such, the pattern information including the predetermined security information sent by the data transmitter dynamically changes. After the data receiver has authenticated the predetermined security information in the pattern information, secure data transmission can be performed. The pattern information in the data transmitter is prevented from being stolen by a malicious user, thereby ensuring the security of the data information of the user of the data transmitter.

The data transmitter includes a processor and a memory. The monitoring unit, the parsing unit, the acquisition unit, the generating unit, and the output display unit are all stored in the memory as program units. The processor executes the program units stored in the memory to achieve the corresponding functions.

The processor includes a kernel. The kernel invokes corresponding program units in the memory. There can be one or more kernels. The kernel parameter can be adjusted to prevent the leakage of the pattern information in the transmitter device, thereby ensuring the security of the data information of the user of the transmitter.

The memory can include a non-persistent memory, a random access memory (RAM), a non-volatile memory, and/or another form that are in a computer readable medium, for example, a read-only memory (ROM) or a flash memory (flash RAM). The memory includes at least one storage chip.

The applications further provide a computer program product. When the computer program product is executed on a data processing device, a program code where the following method steps are initialized is executed: The data transmitter monitors sound wave information including predetermined security information within a predetermined distance, parses the sound wave information and obtains the predetermined security information in the sound wave information, generates pattern information based on the predetermined security information and data information that is to be sent, and outputs and displays the pattern information so that a data receiver can obtain the pattern information.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams illustrating the graphic display method, the apparatus, and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, the computer device includes one or more processors (CPU), an input/output interface, an on-line interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that a computing device can access. According to the definition in the present specification, the computer readable medium does not include transitory computer-readable media (transitory media), such as a modulated data signal and a carrier.

The previous descriptions are merely implementations of the present application, and are not used to limit the present application. For a person skilled in the art, the present application can have various modifications and variations. Any modification, equivalent replacement, or improvement made without departing from the spirit and principle of the present application shall fall within the scope of the claims of the present application.

Figure 12:
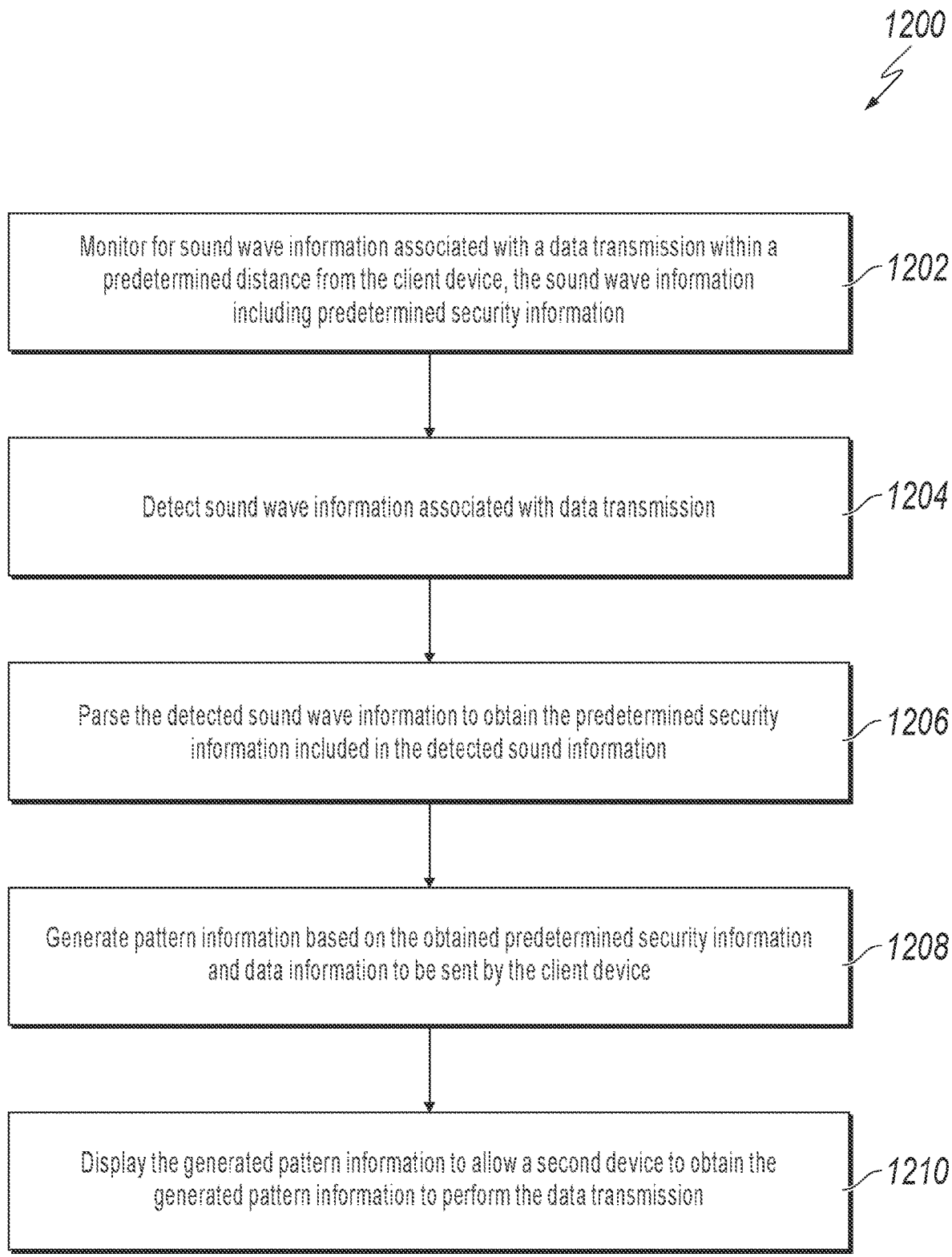
FIG. 12 is a flowchart illustrating an example of a computer-implemented method for transmitting data between devices, according to an implementation of the present disclosure.

FIG. 12 is a flowchart illustrating an example of a computer-implemented method 1200 for transmitting data between devices, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

In general, the present application discloses a method of transmitting data between two devices, such as a data transmitter and a data receiver. The data transmitter may be a smart phone, a smart watch, a tablet, or any other suitable computing device. The data receiver may be a personal computer, a point-of-sale, a smart watch, a tablet, or any other suitable computing device. In some instances, the data transmitter and the data receiver may be the same type of device, including the same model. The data information to be shared across devices can be any sensitive information or data, including personally identifiable information (PII), financial data, documents or data files, images or video or other types of media, or any other types of information.

The solution described herein is meant to provide security for data transmissions performed by two devices within a relatively close area from one another. For example, the devices may be performing a near-field transmission, or another method of device-to-device communication. The data transmitter, a first device from which data information is to be sent to the second device (i.e., the data receiver), can be used to monitor sound wave information provided by the data receiver. The sound wave information can include predetermined security information that can only be obtained by the data transmitter, via a microphone or other input device, when the data transmitter is within a close enough range to pick up or capture the sound wave information. In some instances, that distance may be defined or modified to be a predetermined distance to enforce a relative closeness of the devices before the data transmission can be performed. In some instances, a predetermined distance within which the first device can detect the sound wave information is less than or equal to 1 meter from the data receiver. Although the predetermined distance within which the first device can scan sound wave information may be 3 meters, the predetermined distance to which the data receiver (i.e., the second device) broadcasts the sound wave information may be 1 meter, such that when the data receiver is more than 1 meter from the data transmitter, the data transmitter will not detect the sound wave information. In order to authenticate the data transmission, the actual distance between the first and second device must be lessened so that the data transmitter can obtain the sound wave information including the predetermined security information. The predetermined distance may vary based on the devices used, the relative range of security desired, and the particular implementation to be used.

When the data transmitter and a data receiver perform near-field transmissions, the data transmitter adds predetermined security information for identity security authentication during the data transmission process to ensure the security of the transmitted data. The predetermined security information is used to ensure trust between the data receiver and the data transmitter prior to performing the data transmission. Before receiving the data sent by the data transmitter, the data receiver confirms the validity and security of the predetermined security information to ensure security of the data information sent by the data transmitter. The predetermined security information can include, but is not limited to, dynamic password information, time information, and random code information, among others.

Turning to the illustrated implementation of FIG. 12, at 1202, a data transmitter can perform monitoring operations for sound wave information associated with a data transmission that can be detected within a predetermined distance from a client device. To provide additional security, the sound wave information can include predetermined security information that can be used to generate a trusted relationship between the data transmitter and data receiver once verified. Data transmission will only continue and be performed once the data receiver successfully authenticates the predetermined security information provided by the data transmitter (as originally obtained from the sound wave information broadcast from the data receiver).

The sound wave information transmitted by the data receiver may be an analog signal, such that the data transmitter may need to convert the sound wave information into a digital signal before performing additional operations.

In some instances, monitoring for sound wave information can include invoking, by the data transmitter, a microphone associated with the data transmitter to monitor for sound wave information associated with a future or ongoing data transmission. The monitoring can be for a broadcast of the sound wave information within the predetermined distance from the data transmitter. From 1202, method 1200 proceeds to 1204.

At 1204, sound wave information associated with the data transmission and including the predetermined security information can be detected by the data transmitter. The detection can be made by a microphone associated with the data transmitter, such as a standard microphone used for all input to the data transmitter or a dedicated microphone for capturing the sound wave information. From 1204, method 1200 proceeds to 1206.

At 1206, the detected sound wave information is parsed to obtain the predetermined security information included in the detected sound information. Parsing the detected sound wave information where the sound wave information is an analog signal can include converting the detected sound wave information into a digital signal. A predetermined decoding rule for the predetermined security information can be obtained, where the predetermined security information is then parsed based on the predetermined decoding rule. The predetermining security information can then be obtained from the decoded digital signal, where the security information can then be used to authenticate the data transmission. From 1206, method 1200 proceeds to 1208.

At 1208, pattern information based on the obtained predetermined security information and any data information to be sent by the data transmitter to the data receiver can be generated. Generating the pattern information can include identifying the data information to be sent to the data receiver and then generating, using a predetermined coding algorithm, the pattern information based on the obtained predetermined security information and the identified data information to be sent. The data information may include, for example, private account information, private file information, media files, video information, payment credentials, or financial account information, among others. The pattern information can be or include a QR code, a barcode, a variable barcode, or any other encoded pattern used to transmit the data information. From 1208, method 1200 proceeds to 1210.

At 1210, the generated pattern information can be displayed to allow a second device (i.e., the data receiver) to obtain the generated pattern information to perform an authentication of the data transmitter and allow the data transmission to be performed. As the data to be transmitted is included in the generated pattern information, once the data receiver verifies the predetermined security information, the data receiver can immediately access and receive the data information. The data information can be used to perform any suitable or responsive action as required or needed in the data transmission, including storing the data, forwarding the data, and/or acting upon the data (e.g., to complete a transaction). After 1210, method 1200 stops.

Figure 13:
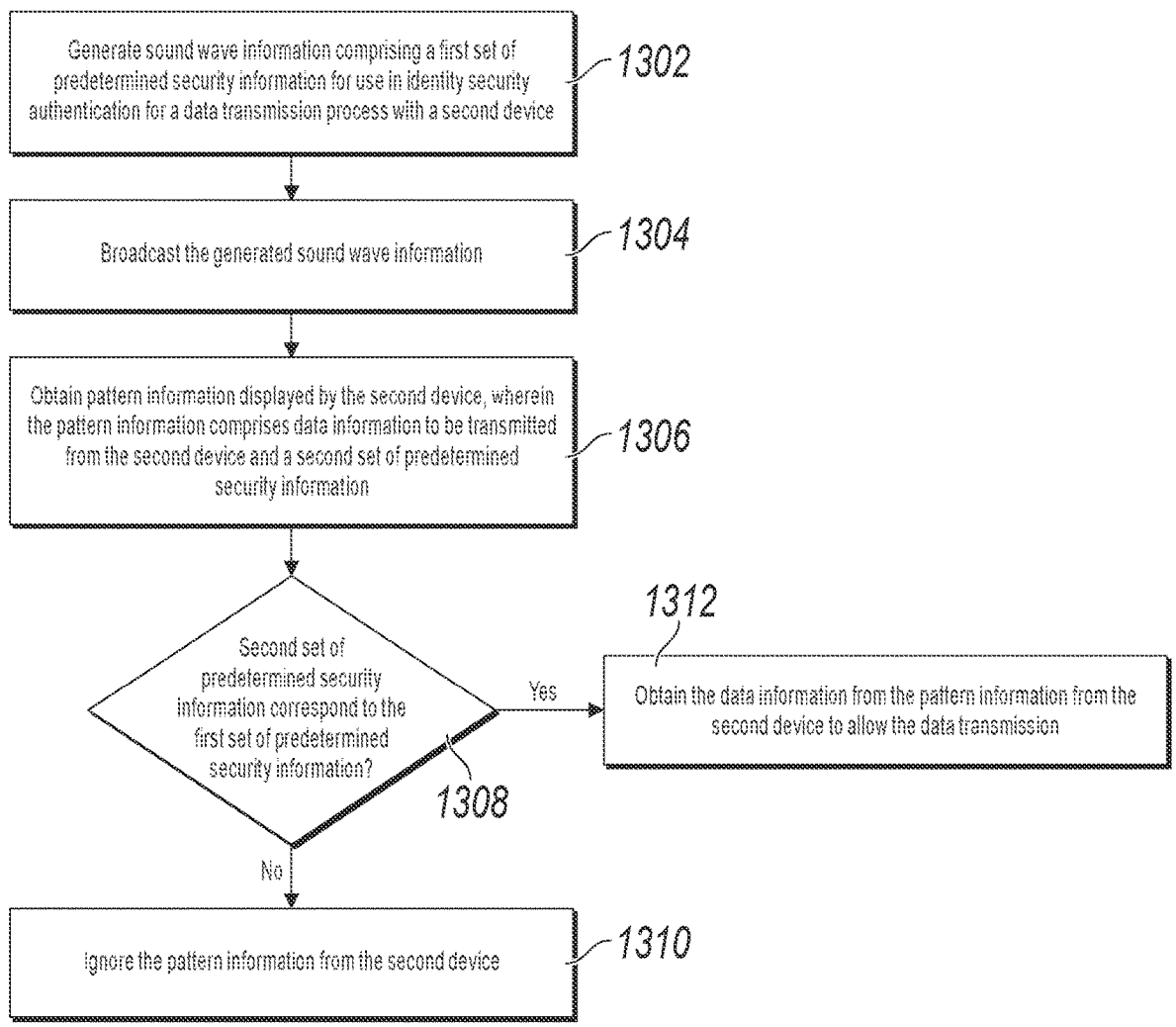
FIG. 13 is a flowchart illustrating an example of a computer-implemented method for transmitting data between devices, according to an implementation of the present disclosure.

FIG. 13 is a flowchart illustrating an example of a computer-implemented method for transmitting data between devices, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order. The operations of method 1300 can be performed, in one example, by a first device representing a data receiver, or a device at which data information is to be transmitted in a data transmission from a second device that is a data transmitter.

At 1302, sound wave information can be generated, where the sound wave information includes a first set of predetermined security information for us in identity security authentication for any future data transmission processes with a second device. When the data receiver encodes the predetermined security information to the sound wave information, the data receiver can use a predetermined coding rule to encode the predetermined security information to the sound wave information. In one implementation, before broadcasting the sound wave information, the data receiver can configure or identify a predetermined decoding rule corresponding to the predetermined coding rule in the sound wave information, so that the data transmitter obtains the predetermined decoding rule after converting the sound wave information from the analog signal into the digital signal, and uses the predetermined decoding rule to parse the predetermined security information in the sound wave information. The data transmitter can then generate pattern information by using the decoded predetermined security information so that the data receiver authenticates the validity of the predetermined security information. The data receiver can determine the validity and legitimacy of the predetermined security information without decoding the predetermined security information. In other instances, before broadcasting the sound wave information, the data receiver does not configure the predetermined decoding rule corresponding to the predetermined coding rule in the sound wave information. When the data transmitter receives the sound wave information, the data transmitter obtains the undecoded predetermined security information and uses the undecoded predetermined security information to generate the pattern information.

In some instances, the first set of predetermined security information may comprise time information carried in the sound wave information. A period of time may be set so that the time information is valid for a particular period of time. If the data receiver broadcasts the sound wave information at 08:00 for the first time, the predetermined security information in the sound wave information is 08/00. Alternatively, if the data receiver broadcasts the sound wave information at 08:10 for the first time, the predetermined security information in the sound wave information is 08/10. This information can be used to confirm that the security information provided by the data transmitter is still valid and corresponds to the first set of predetermined security information.

In some instances, generating the sound wave information can include invoking a preselected sound wave generator and generating the sound wave information comprising the predetermined security information based on the preselected sound wave generator. In some instances, invoking the preselected sound wave generator and generating the sound wave information comprising the predetermined security information based on the preselected sound wave generator can further include invoking a preconfigured sound wave generator in the first device and generating the sound wave information comprising the first set of predetermined security information based on the preconfigured sound wave generator, wherein the preconfigured sound wave generator comprises the preselected sound wave generator. Alternatively, a third party sound wave generator can be invoked to generate the sound wave information comprising the first set of predetermined security information based on the third party sound wave generator. In other instances, generating the sound wave information can include encoding the first set of predetermined to the sound wave information using a predetermined modulation scheme.

At 1304, the generated sound wave information can be broadcast. During the broadcast of the sound wave information, if the data transmitter detects the sound wave information, the data transmitter can parse the sound wave information to obtain the predetermined security information and use the predetermined security information as a certificate for establishing "trusted" data transmission between the data receiver and the data transmitter. In some instances, broadcasting the generated sound wave information can include broadcasting the encoded sound wave information based on a predetermined transmission period, where the first set of predetermined security information differs in each different transmission period. Further, broadcasting the generated sound wave information can include broadcasting the generated sound wave information in all direction by using air as a medium, such that the generated sound wave information is detectable only within a predetermined distance from the first device. From 1304, method 1300 proceeds to 1306.

At 1306, pattern information displayed by the second device is obtained, where the pattern information includes data information to be transmitted to the data receiver and a second set of predetermined security information.

At 1308, a determination is made as to whether the second set of predetermined security information corresponds to the first set of predetermined security information initially included in the broadcast sound wave information. The determination can be made via any suitable authentication technique.

In one instance, determining via the authentication technique whether the second set of predetermined security information corresponds to the first set of predetermined security information can include parsing the obtained pattern information to obtain the second set of predetermined security information, comparing the first set of predetermined security information and the second set of predetermined security information to determine whether the first and second set match, and, in response to determining that the first set of predetermined security information and the second set of predetermined security information match, determining that the obtained pattern information is authenticated.

In other instances, a match may not be necessary to determine that the first set of predetermined security information corresponds to the second set of predetermined security information, but can instead be evaluated based on any suitable authentication comparison or analysis. For example, if the security information is a time-based value, if the time information within the second set of predetermined security information is within a particular time frame relative to the time information of the second set of predetermined security information, then the correspondence can be confirmed.

If it is determined that the security information corresponds to one another, method 1300 proceeds to 1312. At 1312, data information from the obtained pattern information from the data transmitter can be obtained, as the data transmission is determined to be allowed. Otherwise, if it is determined that they do not correspond, method 1300 proceeds to 1310. At 1310, the pattern information, and in particular, the data information within the pattern information, is ignored and no data transmission is performed. After 1310 or 1312, method 1300 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    monitoring, by a client device, for sound wave information associated with a data transmission within a first distance from the client device, the sound wave information including predetermined security information;
    detecting, by the client device, the sound wave information associated with the data transmission within a second distance from the client device, wherein the first distance is greater than the second distance;
    in response to detecting the sound wave information associated with data transmission with the second distance, setting a predetermined time threshold for successfully obtaining the predetermined security information;
    during the predetermined time threshold, parsing, by the client device, the detected sound wave information to attempt to obtain the predetermined security information included in the detected sound wave information;
    determining whether the predetermined security information is successfully obtained within the predetermined time threshold;
    in response to determining the predetermined security information is successfully obtained within the predetermined time threshold:
        generating, by the client device, pattern information based on the predetermined security information and data information for a second device; and
        displaying, by the client device, the generated pattern information when the second device is within the second distance from the client device; and
    in response to determining the predetermined security information is not successfully obtained within the predetermined time threshold, cancelling processing of the detected sound wave information.

2. The computer-implemented method of claim 1, where monitoring for the sound wave information associated with the data transmission within the first distance from the client device comprises:
    invoking, by the client device, a microphone associated with the client device to monitor for the sound wave information associated with the data transmission within the first distance from the client device.

3. The computer-implemented method of claim 1, wherein generating the pattern information based on the predetermined security information and the data information comprises:
    identifying data information to be sent by the client device; and
    generating, using a predetermined coding algorithm, the pattern information based on the predetermined security information and the identified data information to be sent by the client device.

4. The computer-implemented method of claim 1, wherein the predetermined security information includes at least one of dynamic password information, time information, or random code information.

5. The computer-implemented method of claim 1, wherein the client device comprises a smart phone, the second device comprises a point of sale, and wherein the data information to be sent by the client device comprises payment credentials of a user associated with the client device to complete a transaction at the second device.

6. The computer-implemented method of claim 1, wherein the detected sound wave information is an analog signal, and wherein parsing the detected sound wave information to obtain the predetermined security information included in the detected sound wave information comprises:
    converting, by the client device, the detected sound wave information into a digital signal;
    obtaining a predetermined decoding rule for the predetermined security information included in the detected sound wave information;
    parsing the digital signal based on the predetermined decoding rule; and
    obtaining the predetermined security information included in the detected sound wave information.

7. The computer-implemented method of claim 1, wherein the data information to be sent comprises at least one of private account information, private file information, video information, and payment information.

8. A non-transitory, computer-readable medium storing one or more instructions executable by a computer system to perform operations comprising:
    monitoring, by a client device, for sound wave information associated with a data transmission within a first distance from the client device, the sound wave information including predetermined security information;
    detecting, by the client device, the sound wave information associated with the data transmission within a second distance from the client device, wherein the first distance is greater than the second distance;
    in response to detecting the sound wave information associated with data transmission with the second distance, setting a predetermined time threshold for successfully obtaining the predetermined security information;
    during the predetermined time threshold, parsing, by the client device, the detected sound wave information to attempt to obtain the predetermined security information included in the detected sound wave information;
    determining whether the predetermined security information is successfully obtained within the predetermined time threshold;

in response to determining the predetermined security information is successfully obtained within the predetermined time threshold:
  generating, by the client device, pattern information based on the predetermined security information and data information for a second device; and
  displaying, by the client device, the generated pattern information when the second device is within the second distance from the client device; and
in response to determining the predetermined security information is not successfully obtained within the predetermined time threshold, cancelling processing of the detected sound wave information.

9. The non-transitory, computer-readable medium of claim 8, where monitoring for the sound wave information associated with the data transmission within the first distance from the client device comprises:
  invoking, at the client device, a microphone associated with the client device to monitor for the sound wave information associated with the data transmission within the first distance from the client device.

10. The non-transitory, computer-readable medium of claim 8, wherein generating the pattern information based on the predetermined security information and the data information comprises:
  identifying data information to be sent by the client device; and
  generating, using a predetermined coding algorithm, the pattern information based on the predetermined security information and the identified data information to be sent by the client device.

* * * * *